though the inventor has endeavored to describe what he considers to be the best embodiment of his invention, it will be understood that modifications may be made in the details of construction and design without departing from the spirit thereof.

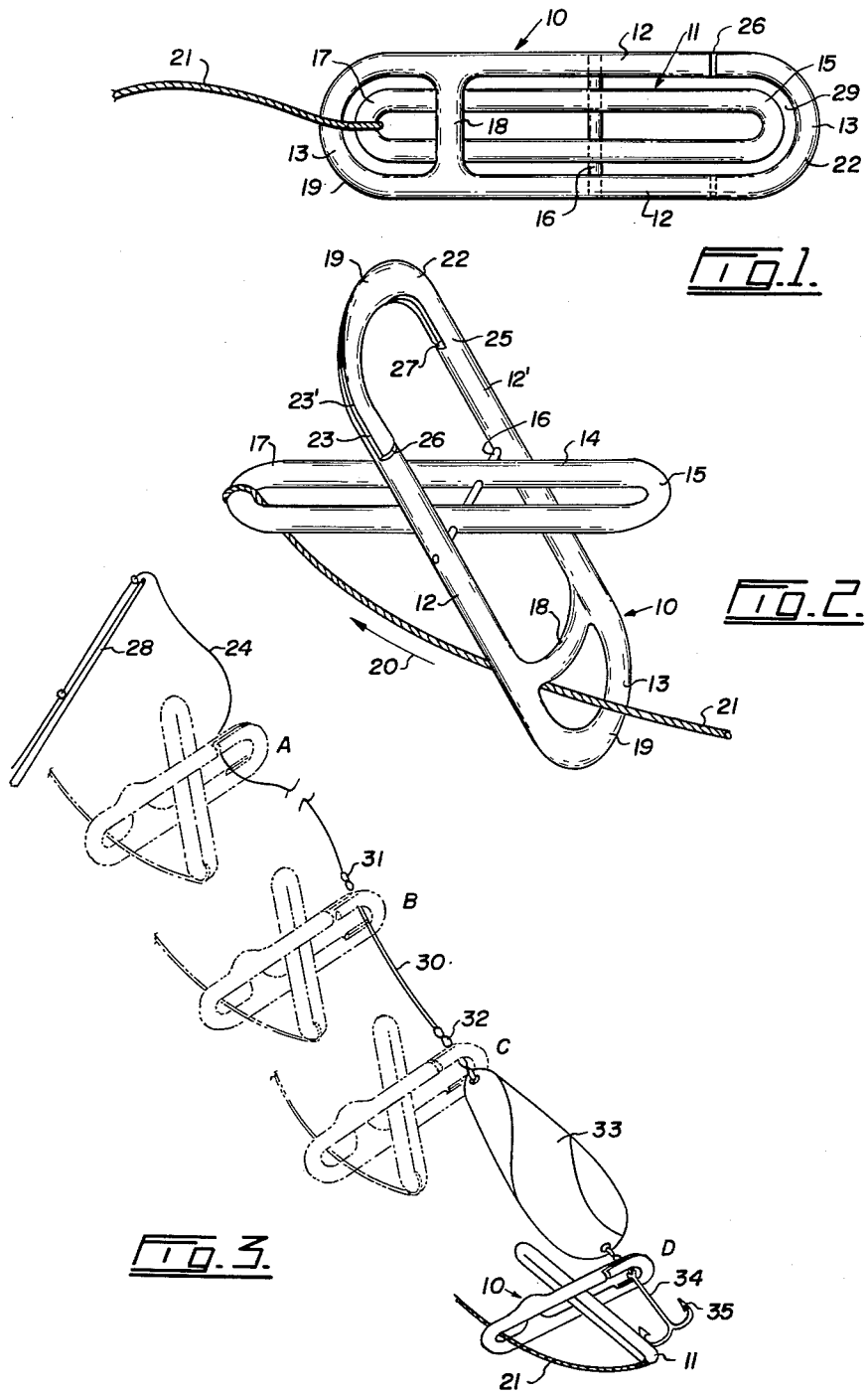

United States Patent Office 3,243,911
Patented Apr. 5, 1966

3,243,911
FISH BAIT RETRIEVER
Thaddeus Mike Splawinski, General Delivery,
Gimli, Manitoba, Canada
Filed June 26, 1964, Ser. No. 378,110
6 Claims. (Cl. 43—17.2)

My invention relates to new and useful improvements in fish bait retrievers.

It is well known that a relatively large amount of tackle is lost as a result of the bait snagging below the water either in rocks, logs, crevices or the like.

It is normal for the hook of the bait or the lure to jam and, due to the relatively light weight fishing line normally used, any attempt to pull the lure or hook free of the obstruction normally results in breakage of the line with the subsequent loss of the leader, the hook, and the lure or tackle, if used in association with the hook.

I have overcome these disadvantages by providing a looped type retriever which may be threaded onto the line, fed downwardly until the lure or hook is reached, whereupon the tackle may be clamped by pulling on the retriever line and strain placed directly upon the tackle by means of the retriever line so that the hook is sprung or broken from the lure which may then be recovered, it being understood that the replacement of the hook element is a relatively simple and inexpensive task compared to the replacement of the entire lure or bait being used.

The principal object and essence of my invention is to provide a device of the character herewithin described which may be engaged upon a conventional fishing line, and then permitted to descend the line freely until the bait is reached whereupon the bait may be clamped by the device for retrieval purposes.

Another object of the invention is to provide a device of the character herewithin described which includes means which prevents the device from clamping on the fishing line per se thus eliminating the possibility of strain being placed upon the line prior to the tackle being reached.

Another object of the invention is to provide a device of the character herewithin described which can be clamped upon the leader, the bait, or the hook element.

Still another object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a plan view of my device.

FIGURE 2 is an isometric view of the device showing same in the open position.

FIGURE 3 is a composite view showing the device upon the line, around the leader, adjacent the bait, and around the hook element.

In the drawings like characters of reference indicate corresponding parts in the different figures.

Proceeding therefore to describe my invention in detail, the device comprises an outer loop component collectively designated 10 and an inner loop component collectively designated 11.

The outer loop component is of an oblong looped configuration and includes a pair of spaced and parallel longitudinally extending members 12, the ends of said members being spanned by semi-circularly curved ends 13 as shown in FIGURE 1 of the drawings.

The inner loop component 11 is similarly constructed but of smaller dimensions, the longitudinal members being identified by the reference character 14 and the curved end members by the reference character 15.

The component 11 is pivotally secured within the components 12 by means of pivot pin 16 passing clear through the longitudinal member 14 and engaging within the longitudinal member 12 of the outer component 10. The pivotal connection is such that when in the closed position shown in FIG. 1, the inner component 11 is maintained in spaced apart relationship from the outer component 10.

The pivot 16 is engaged through the innner component 11 in a position spaced from the center of gravity of the inner component so that when the outer component is held horizontally, one end 17 of the inner component swings towards the vertical position as illustrated in FIG. 2.

A slightly curved bar 18 spans the longitudinal members 12 of the outer component 11 adjacent one end 19 thereof and this prevents the inner component from swinging in a direction opposite to arrow 20, beyond the closed or planar position shown in FIG. 1.

A relatively heavy weight retrieval line 21 is secured to the end 17 of the inner component and passes through the outer component between the cross bar 18 and the end 19 of the outer component as shown in FIG. 2.

The other end 22 of the outer component is provided with an open slot 23 to permit the engagement and disengagement of the device over the associated fishing line 24. This open slot is formed by cutting a slot 24 within the end 22, extending from the end 22 to a location identified by the reference character 25, said slot being on the horizontal plane of the outer component and substantially centrally located within the thickness of the stock from which the outer component is made.

A transverse slot is then made, designated 26, at right angles to the slot 24 downwardly to meet the slot 24 on one side member 12 and a similar slot 27 on the other side member 12′ but upon the opposite side to the first mentioned slot 26 thus forming an open ended slot which permits the line to be threaded through the slot so that the outer component is threaded over the line 24 as shown in FIGURE 3. At the same time inadvertent displacement of the device from the line 24 is prevented by the serpentine nature of the open slot 23.

In operation, when the bait is snagged, the device is threaded upon the line 24 as shown in position A in FIG. 3. The retrieving line 21 is held by the operator and by raising the fishing rod 28, the device slides down the line 24 by gravity, the inner component swinging towards the vertical position so that the device is in the open position shown in FIGURES 2 and 3.

The retrieving device may be used in any of the positions shown at B, C or D in FIG. 3, the principle of operation being similar in all cases.

When the operator believes that the device has reached either of the positions B, C, or D, the retrieving line 21 is pulled thus closing the inner component against the stop bar 18. This clamps the device to the bait in whatever position it is located. However, the space 29 between the end 15 of the inner component and the end 22 of the outer component is such that the line 24 will slide freely therethrough thus preventing inadvertent clamping of the device upon the line 24.

If the device is in position B when the clamping action is initiated, the device will slide along the leader 30 until it reaches the swivel connection 31 which is too large to pass through the gap 29 so that strain can be taken at this point. By the same token, the device will clamp around the swivel assembly 32 between the leader and the bait 33 or around the hook element 34 below the bait 33 depending upon the location of the device.

Irrespective of the position, continual pulling on the retriever line will apply pressure to the hook element 34 until the hook barb 35 either breaks or is sprung from the snagging object.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A fish bait retriever comprising in combination an outer loop component and an inner closed loop component, said inner loop component being pivotally secured within said outer loop component for swinging movement within said outer loop component, stop means cooperating between said loop components restricting said swinging movement, means on one side of said outer loop component for threading and unthreading said outer loop component on and off an associated fishing line, and a retriever line secured to one side of said inner loop component remote from said open slot means, the other side of said inner loop component operatively cooperating with said one side of said outer loop component in tackle clamping relationship.

2. The device according to claim 1 in which the pivotal securement of said inner loop component to said outer loop component is spaced from the center of gravity of said inner loop component and towards the other side thereof, whereby, when said outer loop component is held substantially horizontally, said inner loop component swings towards the vertical position.

3. The device according to claim 2 in which said outer and inner loop components are of oblong looped configuration, each including a pair of spaced and parallel longitudinally extending members and curved end members spanning the ends of said spaced and parallel longitudinal members.

4. The device according to claim 3 in which said stop means comprises a bar spanning said spaced and parallel longitudinally extending members on said outer loop component.

5. The device according to claim 1 in which said outer and inner loop components are of oblong looped configuration, each including a pair of spaced and parallel longitudinally extending members and curved end members spanning the ends of said spaced and parallel longitudinal members.

6. The device according to claim 5 in which said stop means comprises a bar spanning said spaced and parallel longitudinally extending members on said outer loop component.

References Cited by the Examiner

UNITED STATES PATENTS 2,516,036   7/1950   Whitlow et al. _____ 43—17.2

MELVIN D. REIN, *Primary Examiner*.